(No Model.) 2 Sheets—Sheet 1.
G. W. BEVERLY.
COMBINED COTTON AND CORN PLANTER.
No. 358,723. Patented Mar. 1, 1887.
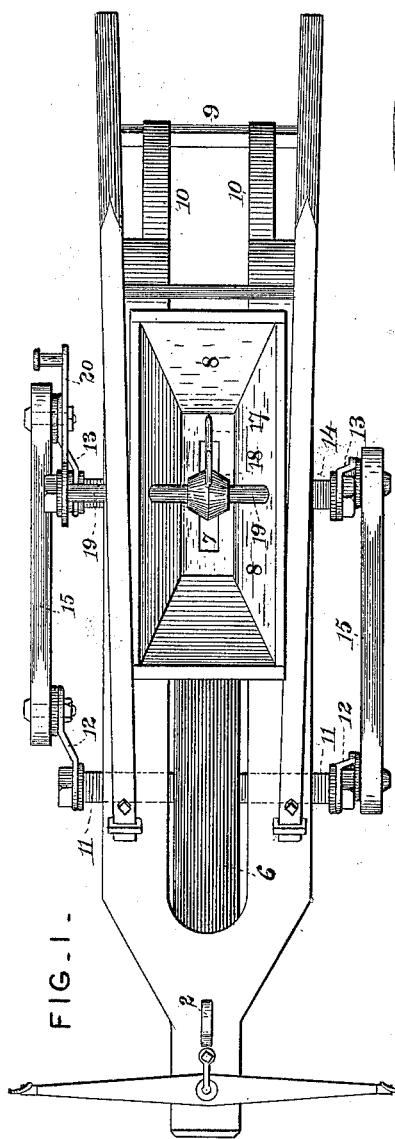
FIG. I.
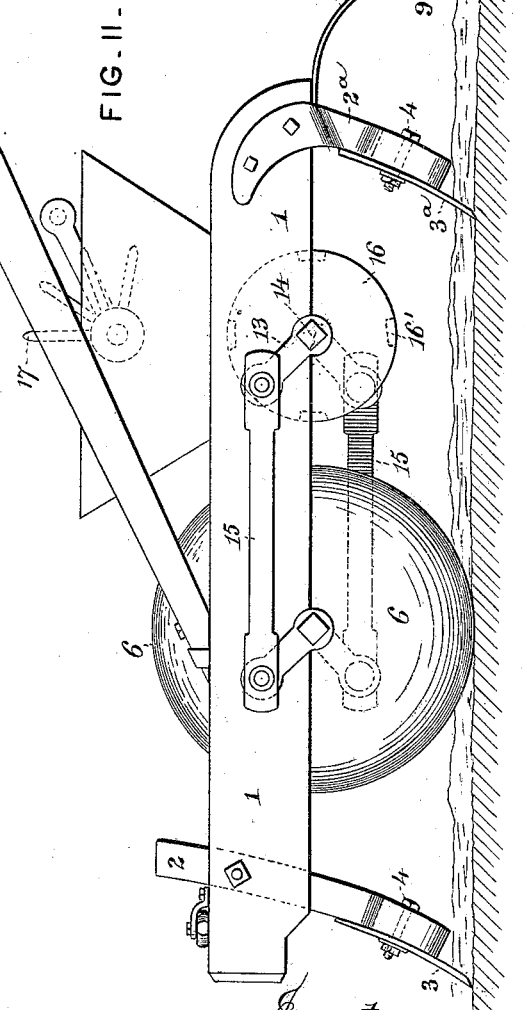
FIG. II.
Attest:
Geo. T. Smallwood.
Walter Allen.
Inventor
George W. Beverly
By Knight Bros
Attys

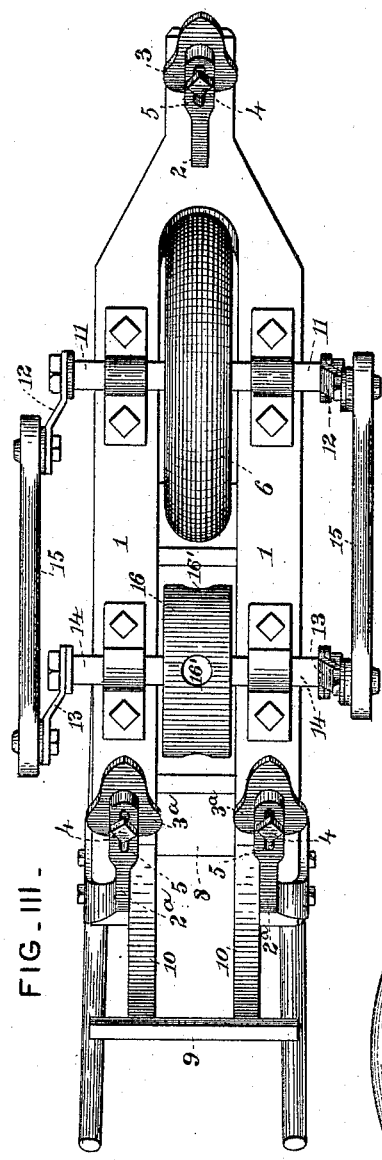

UNITED STATES PATENT OFFICE.

GEORGE W. BEVERLY, OF THOMASVILLE, GEORGIA.

COMBINED COTTON AND CORN PLANTER.

SPECIFICATION forming part of Letters Patent No. 358,723, dated March 1, 1887.

Application filed August 9, 1886. Serial No. 210,458. (No model.)

*To all whom it may concern:*

Be it known that I, GEORGE W. BEVERLY, a citizen of the United Utates, residing at Thomasville, Thomas county, Georgia, have invented certain new and useful Improvements in Combined Cotton and Corn Planters, of which the following is a specification.

My invention is an improvement on those agricultural implements which may with very slight change of their parts be employed for planting either cotton or corn, the idea being that the main frame and the operating mechanism shall be so formed as to enable the operating with and actuating either a corn-dropper or the stirrer of a cotton-seed dropper.

In order that my invention may be fully understood, I will first describe it fully with reference to the accompanying drawings, and then point out in the claim the novel features.

In said drawings, Figure I is a top view of my improved implement. Fig. II is a side elevation thereof. Fig. III is a bottom view. Fig. IV is a side elevation, the hopper being partly broken away to exhibit the stirrer.

The main frame or beam 1 of the implement carries a front standard, 2, having an open shovel or share, 3, and rear standards, $2^a$, to which shovels or shares $3^a$ are connected. The shovels or shares are connected by bolts 4 and slots 5 in such manner as to be capable of vertical adjustment.

6 is the carrying or drive wheel. The front share, 3, is arranged immediately in front of this wheel. The seed-dropping aperture 7 in the hopper 8 is immediately in rear of it, and the shares $3^a$ are in rear and on each side of said aperture, so as to cover the seed when dropped. A board, 9, supported from the frame or beam 1 by spring-arms 10, follows behind the rear shares, $3^a$, for the purpose of knocking of or leveling the ground over the seed.

The axle 11 of the drive-wheel 6 carries on each side a crank, 12, and similar cranks, 13, are carried by the shaft 14, suspended from the frame 1, under the hopper 8. Pitman 15 connects the cranks 12 and 13 on each side of the frame. The cranks 12 and 13 being of the same length, the rotation of the axle 11 will cause the shaft 14 to rotate. The shaft 14 carries a seed-dropper, 16, having cells or receptacles 16' in its periphery to receive corn, peas, or other seed of like nature. It is important that the dropper 16 should have a continuous rotary movement, and hence the necessity of having the cranks 12 and 13 of the same length. It is equally important, however, that the cotton-seed stirrer should not have a continuous rotary movement, but should be reciprocated so that the seed may be thoroughly agitated, and not be in danger of being piled up and becoming clogged on one side of the hopper.

The cotton-seed stirrer consists of a number of arms, 17, carried by a hub, 18, on a shaft, 19, mounted transversely in the hopper considerably above the horizontal plane of the axle 11. The crank 20 on the shaft 19 is elongated, being of greater length than the crank 12, but is adapted to receive one end of the pitman 15 when the latter is disconnected from the crank 13. The result is that by the same pitman and crank, driven from the wheel 6, I am enabled to obtain a continuous rotary movement of the corn-dropper, but an intermittent or reciprocating movement of the cotton-seed stirrer.

A slide, 21, in the bottom of the seed-hopper may be withdrawn to a greater or less extent, according to the quantity of seed to be dropped. When corn is being planted, the slide is preferably drawn out so as to expose the whole of the feeding-aperture, and the cotton-seed stirrer may be turned back into the position shown in Fig. I, so as to be out of the way. When, however, cotton-seed is to be planted, it is only necessary to remove the dropping-wheel 6 and connect crank 20 with pitman 15.

With a combined cotton and corn planter such as described above, in order to vary the distance between the hills it is only necessary to change the carrying-wheel 6, and to adjust the shares up or down on their standards in accordance with the diameter of the new wheel.

Having thus described my invention, the following is what I claim as new therein, and desire to secure by Letters Patent:

In a combined cotton and corn planter, the combination of a beam, a drive-wheel having an axle provided with a crank, a hopper adapted to carry removably a dropper-wheel having a rotary shaft provided with a crank, and a stirrer having an oscillating shaft provided with an elongated crank, and a pitman adapted to be connected interchangeably to and common to all three cranks, substantially as shown and described.

G. W. BEVERLY.

Witnesses:
HARRY E. KNIGHT,
GEO. S. WHEELOCK.